United States Patent [19]

Ando et al.

[11] Patent Number: 4,480,853

[45] Date of Patent: Nov. 6, 1984

[54] WEBBING SUPPORTING DEVICE

[75] Inventors: Takayuki Ando, Okazaki; Shinji Mori, Aichi, both of Japan

[73] Assignee: Kabushiki Kaisha Tokai-Rika-Denki-Seisakusho, Aichi, Japan

[21] Appl. No.: 429,119

[22] Filed: Sep. 30, 1982

[30] Foreign Application Priority Data

Dec. 28, 1981 [JP] Japan ................................ 56-198453

[51] Int. Cl.³ ............................................ B60R 21/10
[52] U.S. Cl. ..................................... 280/801; 280/808
[58] Field of Search ......................... 280/801, 804, 808

[56] References Cited

U.S. PATENT DOCUMENTS

| | | | |
|---|---|---|---|
| 3,236,540 | 2/1966 | Berton et al. | 280/808 |
| 3,842,929 | 10/1974 | Wada et al. | 280/804 |
| 4,274,658 | 6/1981 | Takata | 280/804 |
| 4,315,637 | 2/1982 | Frantom | 280/801 |

FOREIGN PATENT DOCUMENTS 2440204  5/1980  France ................................ 280/801

*Primary Examiner*—Joseph F. Peters, Jr.
*Assistant Examiner*—Kenneth R. Rice
*Attorney, Agent, or Firm*—Koda and Androlia

[57] ABSTRACT

A supporting portion for supporting an occupant restraining webbing and a base portion secured to a vehicle body are flexibly connected to each other through a bundle-shaped yarn member. In consequence, the webbing supporting portion is movable in accordance with a change in the driving posture of an occupant and the like, so that the webbing can be always fastened about the occupant in an optimum state.

10 Claims, 5 Drawing Figures

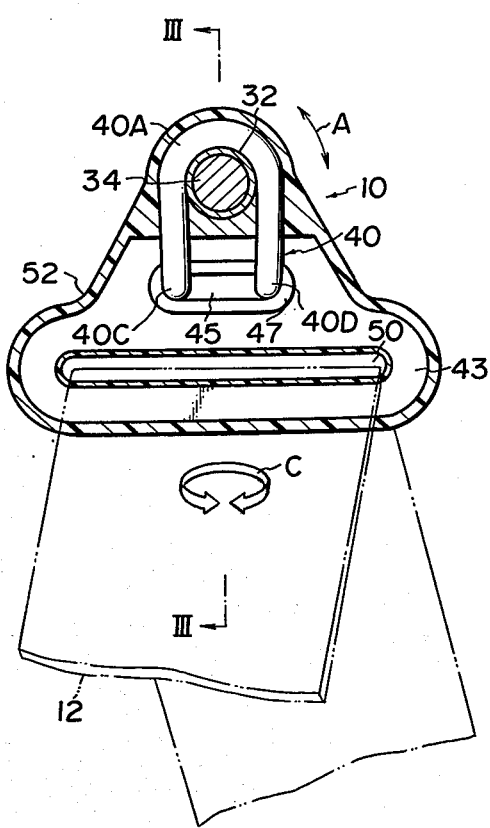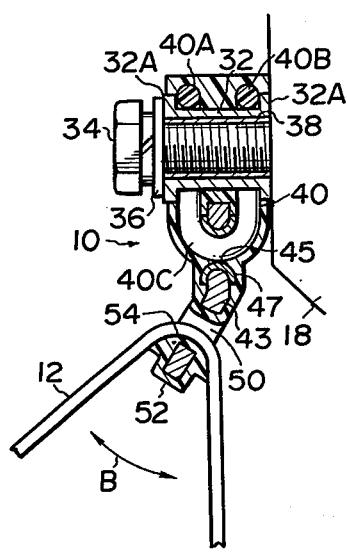

FIG-4
FIG-5
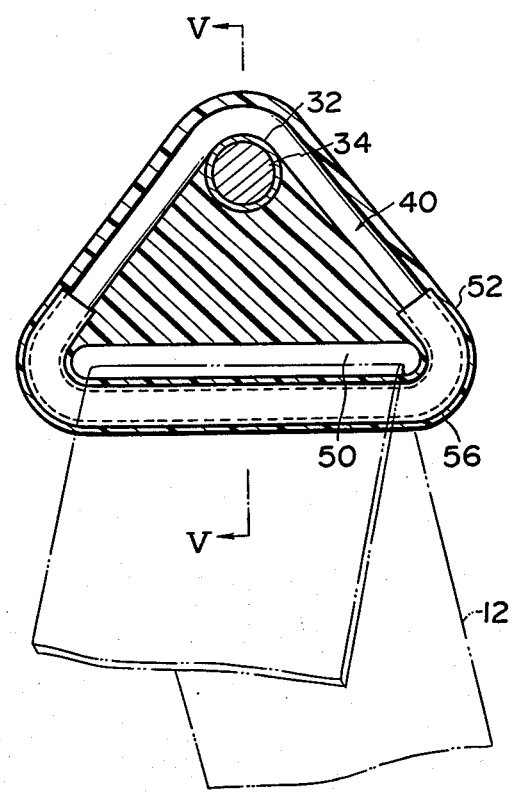
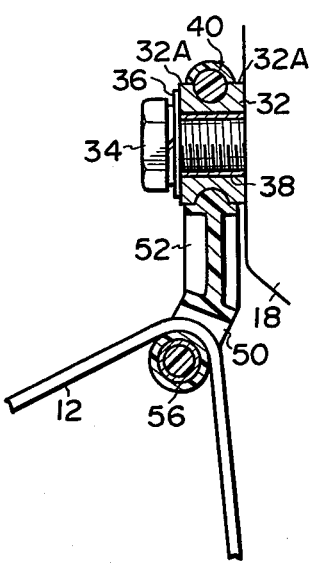

WEBBING SUPPORTING DEVICE

BACKGROUND OF THE INVENTION

1. Field of the Invention

This invention relates to a webbing supporting device used in a seatbelt system for protecting an occupant in an emergency situation of a vehicle, for supporting an occupant restraining webbing on a vehicle body.

2. Description of the Prior Art

A webbing supporting device used in a seatbelt system, for supporting an occupant restraining webbing on a vehicle body is provided on the intermediate portion, an end portion or the like of the webbing, and adapted to bring the webbing into a proper arrangement and to cause a vehicle body to support a tension generated in the webbing thereon to secure an occupant in a restrained state.

In the webbing supporting device of the type described, a supporting portion for supporting the intermediate portion, an end portion or the like is connected to a base portion, and, in general, the base portion is affixed to the vehicle body through a mounting bolt in a manner to be rotatable about the axis of the bolt. In consequence, the webbing supporting device is intentionally rotated about the axis of the bolt, or automatically rotated due to the tension of the webbing, so that a proper arrangement of the webbing can be obtained.

However, in the conventional webbing supporting device, the webbing supporting device can rotate only about the axis of the mounting bolt, whereby the range of webbing position adjustment is limited, so that a proper arrangement of the webbing should not necessarily be obtained. To obviate this disadvantage, heretofore, there has been adopted such a construction that a clearance is provided between the base portion and the mounting bolt, whereby the webbing supporting device is not limited in rotation to the rotation about the axis of the bolt. However, in the webbing supporting device thus improved, noises occur due to the clearance formed between the mounting bolt and the supporting portion during vibrations caused to the vehicle, and special parts are required to arrest the noises.

SUMMARY OF THE INVENTION

The present invention has been developed to obviate the above-described disadvantages of the prior art and has as its object the provision of a webbing supporting device having a high degree of freedom in webbing position adjustment.

In the webbing supporting device according to the present invention, the vehicle body mounted base portion and the webbing supporting portion are connected to each other by means of a bundle-shaped yarn member, so that the supporting portion is desirably movable by deflection of this bundle-shaped yarn member.

Description will hereunder be given of embodiments of the present invention with reference to the drawings.

BRIEF DESCRIPTION OF THE DRAWINGS

FIG. 2 is a sectional view showing the webbing supporting device illustrated in FIG. 1;

FIG. 3 is a sectional view taken along the line III—III in FIG. 2;

FIG. 4 is a sectional view of a second embodiment of the present invention, corresponding to FIG. 2; and FIG. 5 is a sectional view taken along the line V—V in FIG. 4.

DESCRIPTION OF THE PREFERRED EMBODIMENTS

Figure 1:
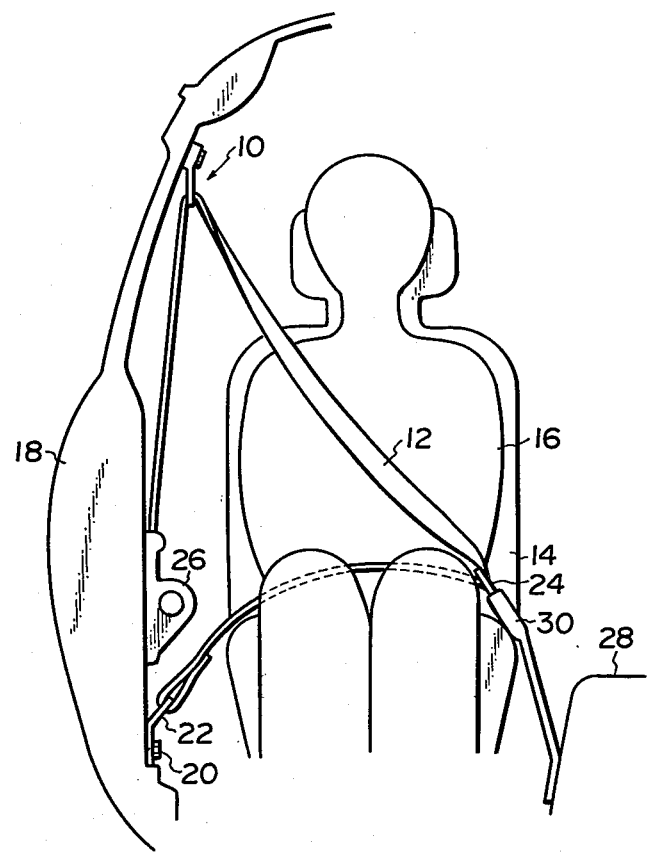
FIG. 1 is a front view showing a first embodiment of the webbing supporting device according to the present invention in looking from the front of the vehicle.

FIG. 1 shows a seatbelt system to which a webbing supporting device 10 according to the present invention is applied.

In this seatbelt system, an occupant 16 seated at a seat 14 is restrained by use of an occupant restraining webbing 12. One end of this webbing 12 is turned back at an anchor plate 22 solidly secured to a side wall 18 of the vehicle through a bolt 20, and then, sewn thereonto. The intermediate portion of the webbing 12 is turned back at a through tongue plate 24 and the webbing supporting device 10, and thereafter, retracted into a retractor 26. This retractor 26 is solidly secured to the side wall 18 of the vehicle somewhat upwardly of the anchor plate 22, adapted to retract the webbing 12 by its biasing force, and incorporates therein an inertia lock mechanism for instantaneously stopping unwinding of the webbing 12 in an emergency situation of the vehicle.

The through tongue plate 24 is engageable with a buckle device 30 erected from a floor 28 substantially in the center of the vehicle. When the occupant engages the through tongue plate 24 with the buckle device 30 upon being seated, he is restrained by the webbing 12 into a three-point seatbelt system fastened state as shown in FIG. 1. In leaving the vehicle, if the occupant presses a release button, not shown, of the buckle device to release the through tongue plate 24 from the buckle device 30, then he is released from the webbing fastened state.

Detailed description will now be given of the webbing supporting device 10 with reference to FIGS. 2 and 3.

The webbing supporting device 10 is provided with a bobbin 32 as being a vehicle mounted base portion. Flange portions 32A project from opposite end portions of this bobbin 32, respectively. One of the flange portions 32A abuts against the side wall 18 of the vehicle, and the other abuts against a washer 36 for a mounting bolt 34 penetrating through the bobbin 32 and threadably coupled to the side wall 18 of the vehicle. A spacer 38 is interposed between the inner periphery of this bobbin 32 and the outer periphery of the bolt 34, so that the webbing supporting device 10 can rotate about the bolt 34 (in a direction indicated by an arrow A in FIG. 2).

A yarn member 40 is guided around the bobbin 32 and turned back thereat. This yarn member 40 is constituted by a pair of U-shaped portions 40A and 40B, each of which is guided semicircularly around the outer periphery of the bobbin 32, a U-shaped portion 40C connecting one end of the U-shaped portion 40A to one end of the U-shaped portion 40B, and a U-shaped portion 40D connecting the other end of the U-shaped portion 40A to the other end of the U-shaped portion 40B, thereby being formed into a loop.

The U-shaped portions 40C and 40D are guided through a slot 45 penetrated through a plate-shaped core member 43 as being a supporting portion for supporting the intermediate portion of the webbing 12. In consequence, this yarn member 40 is previously formed into a loop, the intermediate portion thereof is inserted through the slot 45 of the plate-shaped core member 43, and thereafter, opposite end portions thereof are guided around the outer periphery of the bobbin 32, so that the plate-shaped core member 43 can be held by the bobbin 32.

This yarn member 40 may be made of a synthetic resin material such as nylon, polyester or the like used for producing the occupant restraining webbing 12 having a textile structure. A plurality of yarn materials are bundled, and desirably twisted, are used in the yarn member 40, so that the yarn member can bear a tensile load of a high value and have a flexibility. In consequence, the plate-shaped core member 43 can rotate about a horizontal axis (in a direction indicated by an arrow B in FIG. 3) and a vertical axis (in a direction indicated by an arrow C in FIG. 2), and further, can be disposed at a desired position.

A bush 47 is secured to the inner peripheral portion of the slot 45, whereby the yarn member 40 can avoid directly contacting the plate-shaped core member 43 normally made of a metallic material.

The plate-shaped core member 43 is penetratingly provided therein in parallel to the slot 45 with a webbing insert slot 50 for allowing the webbing 12 to extend therethrough.

A synthetic resin cover 52 is formed to coat the outer peripheries of the bobbin 32, the yarn member 40 and the plate-shaped core member 43 for integrally holding the aforesaid parts to prevent the yarn member 40 from falling off an axial end portion of the bobbin 32. The inner peripheral surface of the webbing insert slot 50 is also coated by this synthetic resin cover 52, so that the intermediate portion of the webbing 12 penetrating through the webbing insert slot 50 and turned back thereat can avoid directly contacting the plate-shaped core member 43. As shown in FIG. 3, provided at a portion of the synthetic resin cover 52 formed on the inner peripheral surface of the webbing insert slot 50 is a portion 54 being semicircular in cross-section, against which a turned-back portion of the webbing 12 abuts, so that the webbing 12 can be turned back at a large curvature.

In the webbing supporting device 10 of the present embodiment with the above-described arrangement, in accordance with the occupant's webbing fastening operation and a change in the driving posture during running of the vehicle, the webbing 12 moves in the longitudinal direction thereof and passes through the webbing insert slot 50. In this case, the frictional resistance is considerably low because the webbing 12 slides on the surface of the synthetic resin cover 52. Furthermore, the yarn member 40 deflects, whereby the plate-shaped core member 43 moves relative to the bobbin 32 to a desired position, so that the occupant 16 can obtain a proper webbing fastened state. In particular, the webbing supporting device 10 is rotatable about the horizontal axis and the vertical axis (in the directions indicated by the arrows B and C) in addition to the rotation about the axis of the bolt 34 (in the direction indicated by the arrow A), so that the plate-shaped core member 43 can move in a direction of approaching or receding from the occupant 16 depending on the change in the driving posture and physical build of the occupant 16. Additionally, the plate-shaped core member 43 rotates in the direction indicated by the arrow C in accordance with the positional adjustment of the seat 14 in the longitudinal direction, so that the surface of the webbing 12 can be tightly fastened about the occupant 16 at all times.

As described above, the plate-shaped core member 43 is desirably movable, whereby a resistance due to the sliding of the webbing passing through the webbing insert slot 50 in the longitudinal direction thereof becomes low, so that the webbing retracting force of the retractor 26 can be lowered, thereby enabling to reduce the oppressive feeling by the webbing rendered to the occupant 16.

Further, in an emergency situation of the vehicle, the occupant 16 moves in the direction of the collision, whereby a tension of a high value occurs in the webbing 12, however, this tension can be reliably supported by the side wall 18 of the vehicle through the plate-shaped core member 43, the yarn member 40, the bobbin 32 and the bolt 34, so that the occupant 16 can be secured in the restrained state.

FIGS. 4 and 5 show the second embodiment of the present invention. In this embodiment, the plate-shaped core member 43 in the preceding embodiment is replaced by a tubular core member 56. The intermediate portion of this tubular core member 56 is disposed perpendicularly to the axis of the bobbin 32 and opposite end portions thereof are bent and directed to the bobbin 32, respectively. The yarn member 40 extends through this tubular core member 56 and a portion of the yarn member 40 is guided around the outer periphery of the bobbin 32 by about one thirds thereof outside the tubular core member 56, thus being generally formed into a triangle.

In the present embodiment, the bobbin 32, the yarn member 40 and the tubular core member 56 are also coated by the synthetic resin cover 52, and the webbing insert slot 50 is formed between the opposite end portions of the tubular core member 56 thus bent. In consequence, the intermediate portion of the webbing 12 is guided around the outer periphery of the tubular core member 56 through the synthetic resin cover 52 and turned back thereat, and a frictional resistance is low because the webbing 12 slides on the surface of the synthetic resin cover 52 in the same manner as in the preceding embodiment.

Also in this embodiment, the tubular core member 56 is held by the bobbin 32 through the bundle-shaped yarn member 40, whereby the tubular core member 56 is movable to a desired position in the same manner as in the preceding embodiment, so that the occupant can obtain an optimum webbing fastened state.

The above-described embodiments are ones in which the present invention is applied to the webbing supporting devices for passing therethrough the intermediate portion of the webbing 12, however, the present invention is applicable to other parts for supporting the webbing on the vehicle body, such as the anchor plate 22, the through tongue plate 24 and so forth.

As has been described hereinabove, in the webbing supporting device according to the present invention, the base portion and the supporting portion are connected to each other through the bundle-shaped yarn member, and hence, the present invention can offer such an outstanding advantage that the degree of freedom in the webbing position adjustment can be increased. Furthermore, the bundle-shaped yarn member is lighter in weight than steel, thus enabling to offer the advantage that the webbing supporting device itself is rendered light in weight.

What is claimed is:

1. A webbing supporting device used in a seatbelt system to protect an occupant, for supporting an occupant restraining webbing on a vehicle body in an emergency situation of a vehicle, comprising:
- a base portion mounted to the vehicle body and having a bobbin through which a bolt for mounting said base portion to the vehicle body extends;
- a supporting portion for supporting said webbing; and
- a bundle-shaped yarn member connecting said base portion to said supporting portion and holding said supporting portion in a manner to be movable relative to said base portion, said bundle-shaped yarn member being guided around and turned back at the outer periphery of said bobbin, whereby said webbing supported by said supporting portion is moved in accordance with a change in driving posture of said occupant or a change in physical build of an occupant entering the vehicle, so as to render a proper webbing fastened state to the occupant.

2. A webbing supporting device as set forth in claim 1, wherein said supporting portion supports said webbing in a manner to be movable in the longitudinal direction thereof, having the intermediate portion of said webbing turned back thereat.

3. A webbing supporting device as set forth in claim 2, wherein said supporting portion is provided with a plate-shaped core member, and the intermediate portion of said webbing is inseted through and turned back at a slot penetrated through said plate-shaped core member.

4. A webbing supporting device as set forth in claim 3, wherein said bundle-shaped yarn member is guided around a second slot penetrated through said plate-shaped core member.

5. A webbing supporting device as set forth in claim 4, wherein outer surfaces of said base portion and plate-shaped core member are coated by a synthetic resin cover to be held integrally.

6. A webbing supporting device as set forth in claim 5, wherein said synthetic resin molded cover is applied to the inner periphery of said first slot of the plate-shaped core member for turning said webbing back, against which cover said webbing is abutted.

7. A webbing supporting device as set forth in claim 1, wherein said bundle-shaped yarn member is formed into a loop, a part of which is guided around said supporting portion.

8. A webbing supporting device as set forth in claim 1, wherein said supporting portion has a tubular core member, around which said webbing is guided, and said bundle-shaped yarn member penetrates through and is turned back at said tubular core member.

9. A webbing supporting device used in a seatbelt system for restraining an occupant in an emergency situation of a vehicle, comprising:
- a bolt for mounting said webbing supporting device to a vehicle body;
- a cylindrical member having a hole, through which said mounting bolt penetrates;
- a loop-like, bundle-shaped yarn member having a pair of U-shaped portions substantially semicircularly guided around said cylindrical member;
- a plate-shaped core member, which the intermediate portion of an occupant restraining webbing is inserted through and turned back at, said core member guiding therearound the intermediate portion of a U-shaped portion connecting one end of one of said pair of U-shaped portions of said bundle-shaped yarn member to one end of the other of said pair of U-shaped portions and also the intermediate portion of another U-shaped portion connecting the other end of one of said pair of U-shaped portions to the other end of the other of said pair of U-shaped portions; and
- a synthetic resin cover coated on the other peripheries of said cylindrical member, bundle-shaped yarn member and plate-shaped core member to be integrally held by said cylindrical member through said bundle-shaped yarn member and said plate-shaped core member being flexibly held by said cylindrical member, whereby the webbing is always fastened about the occupant in an optimum condition.

10. A webbing supporting device for supporting the intermediate portion of an occupant restraining webbing in a manner to be movable in the longitudinal direction thereof in an emergency situation of a vehicle, comprising:
- a cylindrical member secured to a vehicle body in a manner to be rotatable about the axis thereof;
- a tubular core member whose outer periphery guides therearound the intermediate portion of said webbing;
- a bundle-shaped yarn member, a part of which penetrates through said tubular core member and the remaining part is guided around the outer periphery of said cylindrical member; and
- a synthetic resin cover for integrally holding said cylindrical member, bundle-shaped yarn member and tubular core member, so that said tubular core member can be movably held by said cylindrical member.

* * * * *